(12) United States Patent
Paddick et al.

(10) Patent No.: US 11,609,398 B2
(45) Date of Patent: Mar. 21, 2023

(54) SPLICE TRAY FOR OPTICAL FIBER SPLICES AND AN OPTICAL TERMINATION BOX WITH SAID SPLICE TRAY

(71) Applicant: Prysmian S.p.A., Milan (IT)

(72) Inventors: Nathan Paddick, Milan (IT); Ben Croucher, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 17/220,838

(22) Filed: Apr. 1, 2021

(65) Prior Publication Data

US 2021/0311278 A1   Oct. 7, 2021

(30) Foreign Application Priority Data

Apr. 2, 2020   (IT) .................. 102020000007045

(51) Int. Cl.
    *G02B 6/44*   (2006.01)
(52) U.S. Cl.
    CPC .................. *G02B 6/4454* (2013.01)
(58) Field of Classification Search
    CPC .................................................. G02B 6/4454
    See application file for complete search history.

(56) References Cited

U.S. PATENT DOCUMENTS

| | | | |
|---|---|---|---|
| 4,418,982 A * | 12/1983 | Williams | G02B 6/4455 211/208 |
| 4,702,551 A | 10/1987 | Coulombe | |
| 5,185,845 A | 2/1993 | Jones | |
| 5,420,958 A | 5/1995 | Henson et al. | |
| 5,870,519 A | 2/1999 | Jenkins et al. | |
| 6,226,436 B1 * | 5/2001 | Daoud | G02B 6/4442 385/134 |
| 8,385,711 B2 | 2/2013 | Fabrykowski et al. | |
| 9,348,105 B2 * | 5/2016 | Rudenick | G02B 6/444 |
| 2009/0074371 A1 | 3/2009 | Bayazit et al. | |
| 2019/0004267 A1 | 1/2019 | Courchaine et al. | |
| 2019/0250331 A1 | 8/2019 | Agata et al. | |
| 2021/0311278 A1 * | 10/2021 | Paddick | G02B 6/4454 |

FOREIGN PATENT DOCUMENTS

| | | | |
|---|---|---|---|
| EP | 1929348 B1 | 10/2011 | |
| FR | 2743899 A1 | 7/1997 | |
| WO | WO-9400786 A1 * | 1/1994 | G02B 6/4442 |
| WO | WO 97/02504 A1 | 1/1997 | |
| WO | WO 2014/121444 A1 | 8/2014 | |

* cited by examiner

*Primary Examiner* — Rhonda S Peace
(74) *Attorney, Agent, or Firm* — Seed IP Law Group LLP (57) ABSTRACT

A splice tray for optical fiber splices comprising: a base having a splice area for retaining optical fiber splices and a routing area for passage of optical fibers from and towards the splice area; splice holders arranged on the splice area, each splice holder having holding members configured to hold optical fiber splices; retaining arrangements arranged on the base and configured to retain the splice holders; each retaining arrangement comprises sliding guides projecting from the base and configured to receive and retain one or more splice holders; and each splice holder is slidable relative to the sliding guides along a sliding direction transversal to the base between a retracted position, in which the splice holder is proximate to the base and an extracted position in which the splice holder is spaced apart from the base along the sliding direction.

16 Claims, 8 Drawing Sheets

SPLICE TRAY FOR OPTICAL FIBER SPLICES AND AN OPTICAL TERMINATION BOX WITH SAID SPLICE TRAY

BACKGROUND

Technical Field

The present disclosure relates to the fields of equipment and components for the installation of optical cables and their optical splices. In particular, the present disclosure relates to the field of optical fiber splice trays and optical fiber splice closures and/or boxes.

Description of the Related Art

Typically, optical fiber cables enter into an optical fiber splice closure which includes splice trays configured to retain optical splices. The splice trays usually are pivotally connected one another or to a central panel. Extra optical fibers are routed and/or coiled in specific areas on the splice trays or externally to the splicing trays.

Splice trays have a limited area to hold optical splices. Specifically, known solutions allow splice trays to hold splice holders attachable to the tray and stackable on top of one another.

Due to this stackable arrangement, access to the splice holders which are not on the top is difficult and the operators take a lot of time to perform maintenance operations and/or optical fibers installation. Splice holders stacked on top of one another, besides causing removal difficulties, do not provide sufficient space to repair the optical splices and locate new splice holders.

Furthermore, in case of any fault, the optical fibers of the fault splice holders have to be moved among all of the fibers on the tray and cut and re-spliced. These operations cause the risk to damage and/or entangle other fibers.

EP 1929348 B1 discloses a splice tray arrangement including a tray and a splice chip arrangement. The splice chip arrangement includes stackable splice chips defining channels for holding splice elements. Each of the splice chips includes a mounting arrangement for mounting the splice chip at a mounting location on the tray and a stacking arrangement for mounting the splice chip upon another splice chip.

U.S. Pat. No. 8,385,711 B2 discloses splice holders for managing and storing splices between optical fibers in fiber optic hardware and equipment. The splice holder includes a base portion and an array of splice holding partitions extending from the base portion. In some embodiments, the array of splice holding partitions define a plurality of rows for receiving a respective first splice component along a first direction and a plurality of columns intersecting the plurality of fiber rows for receiving a second splice component along a second direction. Similarly, in some embodiments, selected pairs of splices holding partitions define a column width and selected pairs of splices holding partitions define a row width. Additionally, in some embodiments, the column width is sufficiently greater than the row width to accommodate the second splice component oriented along one of the plurality of columns that could not otherwise be accommodated if oriented along one of the plurality of rows.

The above-mentioned splice trays provide arrangements able to retain the splice holders without optimizing the available space on the tray and causing the difficulties above mentioned. Specifically, in EP 1929348 B1, the mounting arrangement permits the splice chip to be secured to a second splice chip in a stacked relationship. However, the mounting arrangement does not provide an easy access to each splice. Moreover, the stacking of chips on a single tray leads to a significant increase of the total height limited to the side wall. Furthermore, the mounting arrangement also causes an increase of the complexity in the managing of the splices. On the other hand, U.S. Pat. No. 8,385,711 B2 discloses a single splice holder attached to the tray without effectively optimizing the available space.

BRIEF SUMMARY

The applicant has tackled the problem of providing a splice tray able to maximize the usage of the available space on the tray and at the same time to allow an easy access to the optical splices.

The applicant has found that providing a splice tray with slidable splice holders by means of sliding guides projecting from the splice tray itself, optimizes the available space on the tray increasing the number of installable splice holders and guarantees an easy and quick access to the optical fiber and to the optical splices.

Therefore, the present disclosure relates to a splice tray for optical fiber splices comprising a base having a splice area for retaining optical fiber splices and a routing area for passage of optical fibers from and towards the splice area, splice holders arranged on the splice area, each splice holder having holding members configured to hold optical fiber splices, retaining arrangements arranged on the base and configured to retain the splice holders; wherein each retaining arrangement comprises sliding guides projecting from the base and configured to receive and retain one or more splice holders; and each splice holder is slidable relative to the sliding guides along a sliding direction transversal to the base between a retracted position, in which the splice holder is proximate to the base and an extracted position in which the splice holder is spaced apart from the base along the sliding direction.

According to one embodiment, the base comprises a connecting member defining a rotation axis to pivotally connect the base to an optical termination box.

According to one embodiment, the retaining arrangements are arranged mutually adjacent along a stacking direction transversal to the sliding direction to retain the splice holders mutually adjacent along the stacking direction.

According to one embodiment, each splice holder comprises a support base which comprises a first portion and a second portion spaced apart along a first direction transversal to the sliding direction and configured to engage the sliding guides.

According to one embodiment, the retaining arrangements are adjacently arranged along the stacking direction in such a way that the support bases of the splice holders are retained in a mutually faced relationship.

According to one embodiment, the support bases of the splice holders are retained in a mutually faced and parallel relationship.

According to one embodiment, the splice tray comprises locking arrangements configured to selectively lock sliding of the splice holders in the retracted position and in extracted position.

According to one embodiment, the locking arrangements comprises first locking elements formed on the sliding guides and second locking elements formed on the splice holders, the first locking elements and the second locking elements being configured to cooperate at least in the retracted position and in the extracted position.

According to one embodiment, the first locking elements and the second locking elements are configured to cooperate to selectively retain the splice holder in the retracted position and limit the slide of the splice holder along the sliding direction to lock the splice holder in the extracted position.

According to one embodiment, the sliding guides comprise first guiding members and second guiding members projecting from the base along the sliding direction.

According to one embodiment, the first guiding members are spaced apart from the second guiding members along a transversal direction perpendicular to the sliding direction to define a receiving area therebetween for receiving the one or more splice holders.

According to one embodiment, the first guiding members are mutually spaced apart along a stacking direction transversal to the sliding direction and to the transversal direction; and the second guiding members are mutually spaced apart along the stacking direction.

According to one embodiment, the first guiding members and the second guiding members are configured to elastically deform along the transversal direction and generate an elastic force along the transversal direction and directed towards the splice holder upon insertion of the splice holders between the first guiding members and second guiding members.

According to one embodiment, the holding members comprise parallel holding walls projecting from the support base, each holding wall extending along the first direction and being configured to hold and separate the optical splices.

According to one embodiment, the holding walls are mutually spaced apart along the sliding direction to define holding seats therebetween configured to receive the optical splices.

According to a further aspect, the present disclosure relates to an optical termination box comprising a splice tray for optical splices, the splice tray comprising a base having a splice area for retaining optical fiber splices and a routing area for passage of optical fibers from and towards the splice area, splice holders arranged on the splice area, each splice holder having holding members configured to hold optical fiber splices, retaining arrangements arranged on the base and configured to retain the splice holders; each retaining arrangement comprises sliding guides projecting from the base and configured to receive and retain one or more splice holders; and each splice holder is slidable relative to the sliding guides along a sliding direction transversal to the base between a retracted position, in which the splice holder is proximate to the base and an extracted position in which the splice holder is spaced apart from the base along the sliding direction.

According to one embodiment, the optical termination box comprises a frame with a bottom wall and one or more side walls projecting from the bottom wall, the bottom wall and the side walls defining a tray area, the splice tray is arranged on the tray area.

According to one embodiment, the base of the splice tray comprises a connecting member defining a rotation axis, the connecting member pivotally connecting the base of the splice tray to the frame of the optical termination box.

BRIEF DESCRIPTION OF THE SEVERAL VIEWS OF THE DRAWINGS

The present disclosure will now be described in more detail hereinafter with reference to the accompanying drawings, in which some embodiments of the disclosure are shown.

DETAILED DESCRIPTION

For the purpose of the present disclosure, an optical cable is deemed to be any optical cable comprising one or more optical fibers, an outer sheath and, optionally, strength members.

Figure 8:
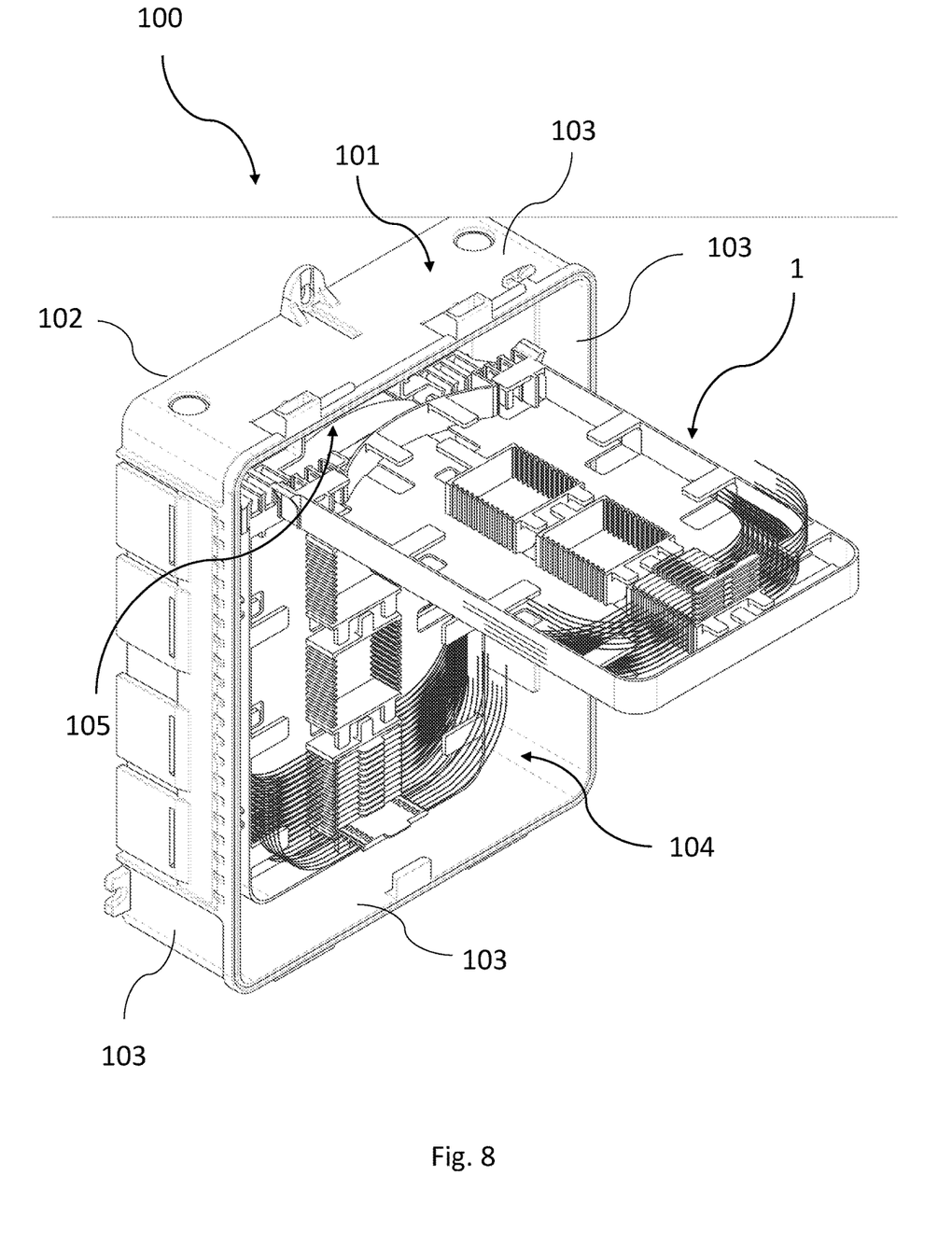
FIG. 8 is a perspective view of an optical termination box according to one embodiment of the present disclosure.

FIGS. 1-4 show a splice tray 1 for optical fiber splices 2. FIG. 8 shows such splice tray 1 associated to an optical termination box 100. It is to be noted that each fiber splice 2 is typically inserted in a relative splice protector. For simplicity, in the following fiber splice has been indicated as the assembly of a splice combined with a relative splice protector.

The optical termination box 100 comprises a frame 101 with a bottom wall 102 and side walls 103 projecting from the bottom wall 102. The bottom wall 102 and the side walls 103 define a tray area 104 on which the splice tray 1 is arranged.

According to one embodiment, each splice tray 1 is pivotally connected to the optical termination box 100. Specifically, each splice tray 1 can reversibly pass from a storage position wherein the splice tray 1 is arranged in the tray area 104 to an operation position wherein the splice tray 1 is rotated and protrudes from the termination box 100.

Thanks to the rotation of the splice tray 1 in the operation position, the operations on the splice tray 1 are facilitated.

According to one embodiment, the termination box 100 comprises rotation members 105 configured to be associated to a relative splice tray 1 allowing it to rotate from the storage position to the operation position and vice versa. The rotation members 105 are associated to one of the sidewalls 103 of the optical termination box 100 as a function of splice tray shape.

The splice tray 1 comprises a base 10 on which the optical fiber splices 2 are retained, splice holders 20 to hold optical fiber splices 2 and retaining arrangements 30 configured to retain the splice holders 20 on the base 10.

According to one embodiment, the base 10 has a splice area 11 wherein the optical fiber splices 2 are retained and a routing area 12 wherein optical fibers 3 can pass through from and towards the splice area 11.

The splice tray 1 comprises a lateral wall 13 surrounding the splice area 11 and the routing area 12. Such lateral wall 13 can project from the base 10 and can be associated to a cover (not shown) to define an inner volume between the base 10, lateral wall 13 and the cover.

Alternatively, the lateral wall 13 can project from the cover. In this way, the cover associated to the base 10 defines the inner volume between the base 10, lateral wall 13 and the cover.

According to one embodiment, the base 10 comprises one or more openings 14 for receiving optical fibers 3 and allowing exit of the optical fibers 3 from the splice tray 1. Specifically, the openings 14 are mutually spaced apart in order to reduce the bend radius of the optical fibers 3 at the retaining arrangements 30. It is to be noted that the openings 14 can be formed on a same side of lateral wall 13. In detail, the base 10 comprises routing paths 16 on the routing area 12 that address the optical fibers 3 from the openings 14 to the retaining arrangements 30.

According to one embodiment, a connecting member 15 is associated to the base 10 and defines a rotation axis C-C to pivotally connect the base 10 to an optical termination box 100 as shown in FIG. 8. The connecting member 15 can be connected to the lateral wall 13 between the openings 14. Specifically, the connecting member 15 pivotally connects the base 10 of the splice tray 1 to the frame 101 of the optical termination box 100. In details, the connecting member 15 is associated to a relative rotating member 105 of the optical termination box 100 to rotate the slice tray 1. In detail, each splice tray 1 can rotate around the rotation axis C-C from the storage position to the operation position thanks to the cooperation of the connecting member 15 and the rotation member 105.

The retaining arrangements 30 are arranged on the base 10 and can be arranged at the splice area 11 of the base 10.

Each retaining arrangement 30 comprises sliding guides 40.

The sliding guides 40 project from the base 10 and are configured to receive and retain one or more splice holders 20.

The sliding guides 40 are configured to allow the splice holders 20 to slide along a sliding direction X-X transversal to the base 10 between a retracted position, in which the splice holder 20 is proximate to the base 10 and an extracted position in which the splice holder 20 is spaced apart from the base 10 along the sliding direction X-X.

According to one embodiment, the sliding direction X-X is perpendicular to the base 10.

According to one embodiment, the retaining arrangements 30 are arranged mutually adjacent along a stacking direction Y-Y transversal to the sliding direction X-X to retain the splice holders 20 mutually adjacent along the stacking direction Y-Y.

In this way, the sliding guides 40 allow retaining the splice holders 20 along the stacking direction Y-Y and sliding the splice holders 20 along the sliding direction X-X.

Figure 7:
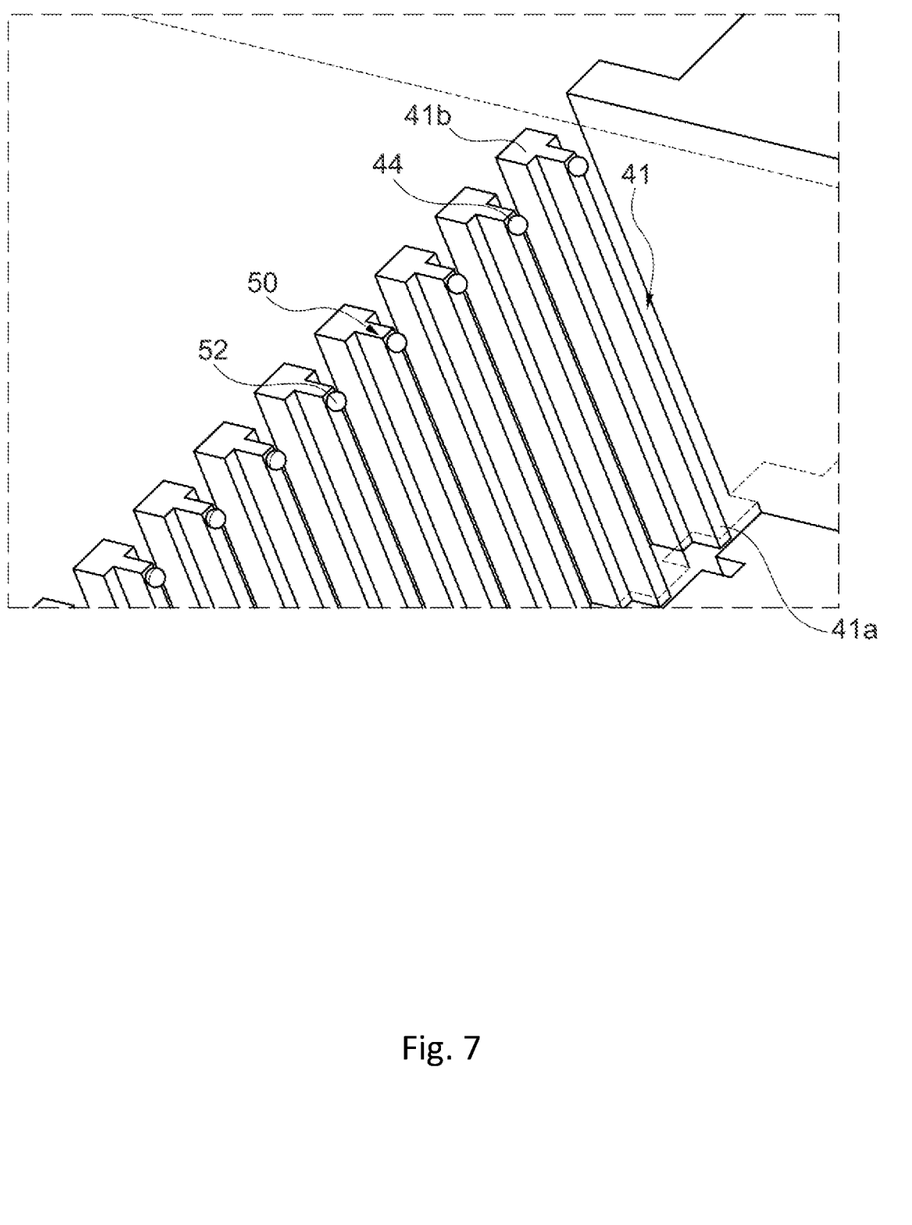
FIG. 7 is a perspective view of a detail of a splice tray according to one embodiment of the present disclosure.

According to one embodiment, the sliding guides 40 comprise first guiding members 41 and second guiding members 42.

The first guiding members 41 and the second guiding members 42 project from the base 10 along the sliding direction X-X. Specifically, the first guiding members 41 and the second guiding members 42 extend along the sliding direction X-X between a first end portion 41a, 42a attached to the base and an opposed second free end portion 41b, 42b.

The first guiding members 41 are spaced apart from the second guiding members 42 along a transversal direction Z-Z perpendicular to the sliding direction X-X to define a receiving area 46 therebetween for receiving the splice holders 20.

Moreover, the first guiding members 41 are mutually spaced apart along the stacking direction Y-Y transversal to the sliding direction X-X and to the transversal direction Z-Z as well as the second guiding members 42 are mutually spaced apart along the stacking direction Y-Y. In other words, the first guiding members 41 and the second guiding members 42 spaced apart along the stacking direction Y-Y are arranged mutually adjacent along the stacking direction Y-Y.

Specifically, the first guiding members 41 and the second guiding members 42 adjacently arranged and mutually spaced apart define respective first sliding seats 44 and second sliding seats 45 therebetween.

The first sliding seats 44 and the second sliding seats 45 are configured to retain a portion of the splice holders 20 therebetween allowing the sliding of the splice holders 20 along the sliding direction X-X.

According to one embodiment, the first guiding members 41 and the second guiding members 42 are configured to elastically deform along the transversal direction Z-Z and generate an elastic force along the transversal direction Z-Z and directed towards the splice holder 20 upon insertion of the splice holder 20 between the first guiding members 41 and second guiding members 42.

Specifically, the first guiding members 41 and the second guiding members 42 are configured to elastically deform and flex starting from the second free end portions 41b, 42b upon insertion of the splice holder 20 between the first guiding members 41 and second guiding members 42.

Therefore, the first guiding members 41 and the second guiding members 42 are elastically deformable so that the second free end portions 41b, 42b mutually space apart along the transversal direction Z-Z upon insertion of splice holders 20 therebetween. Then the first guiding members 41 elastically push the inserted splice holder 20 towards the opposite the second guiding members 42. By this way, the splice holders 20 are guided along the sliding direction X-X and retained along the transversal direction Z-Z and along the stacking direction Y-Y.

Thanks to the elastic properties of the first guiding members 41 and the second guiding members 42, the retaining arrangements 30 are able to firmly retain the splice holders 20 and to improve the gripping effect on the splice holders 20 along the transversal direction Z-Z. Furthermore, the elastic properties of the first guiding members 41 and the second guiding members 42 allow an easy insertion and extraction of the splice holders 20 in and from the retaining arrangements 30 simplifying the maintenance and installation operations.

According to one embodiment, the stacking direction Y-Y can be perpendicular to the sliding direction X-X. The transversal direction Z-Z can be perpendicular to the sliding direction X-X. It is to be noted that, the transversal direction Z-Z can be perpendicular to the sliding direction X-X and to the stacking direction Y-Y.

According to one embodiment, as shown in FIGS. 1-4, the splice tray 1 comprises one or more arrays 31 of retaining arrangements 30 arranged on the base 10. The arrays 31 can be mutually spaced apart along the stacking direction Y-Y defining routing channels 32 between them. The arrays 31 can also be centered on the base 10 with respect to the lateral wall 13 such that they are surrounded by the routing area 12.

Accordingly, the optical fibers 3 entering the splice tray 1 from the openings 14 are addressed to the retaining arrangements 30 along the routing area 12, specifically, along the routing paths 16.

Figure 5:
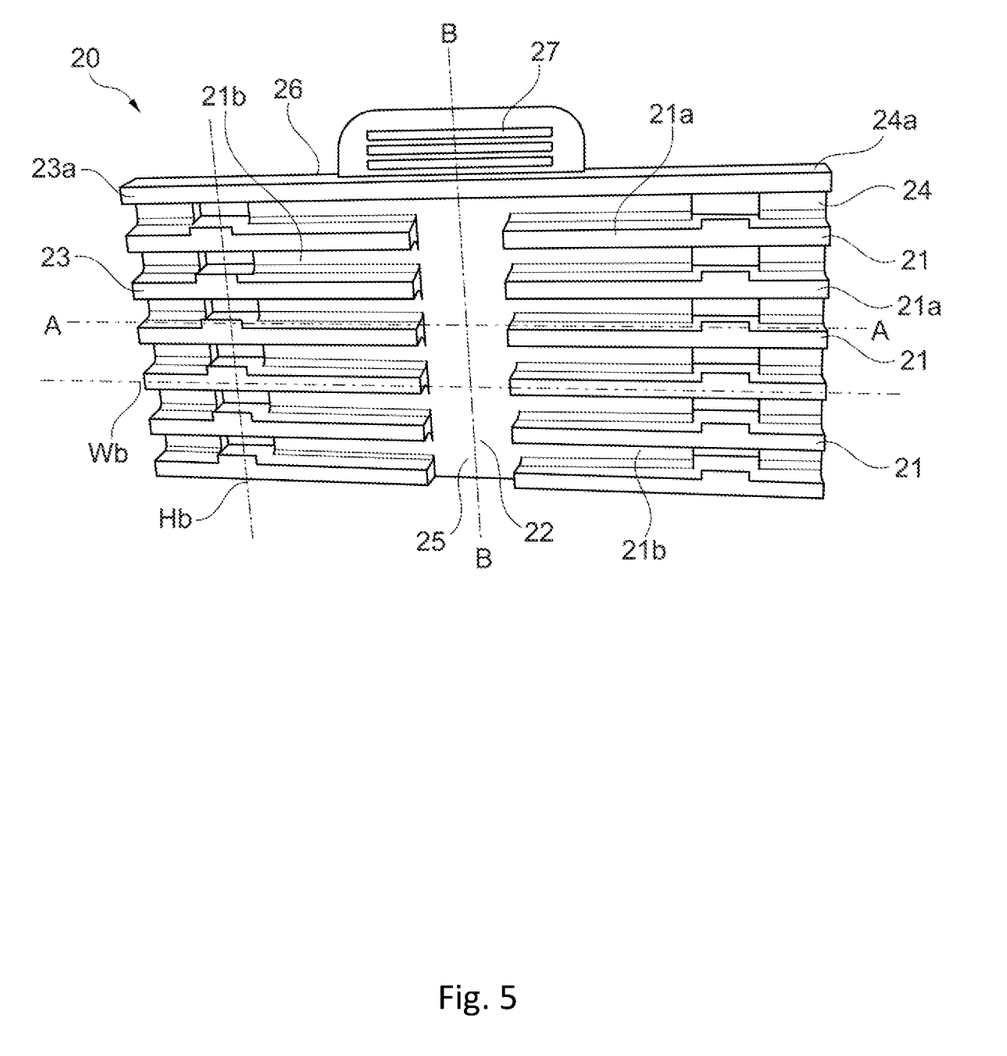
FIG. 5 is a first perspective view of a splice holder according to one embodiment of the present disclosure.
Figure 6:
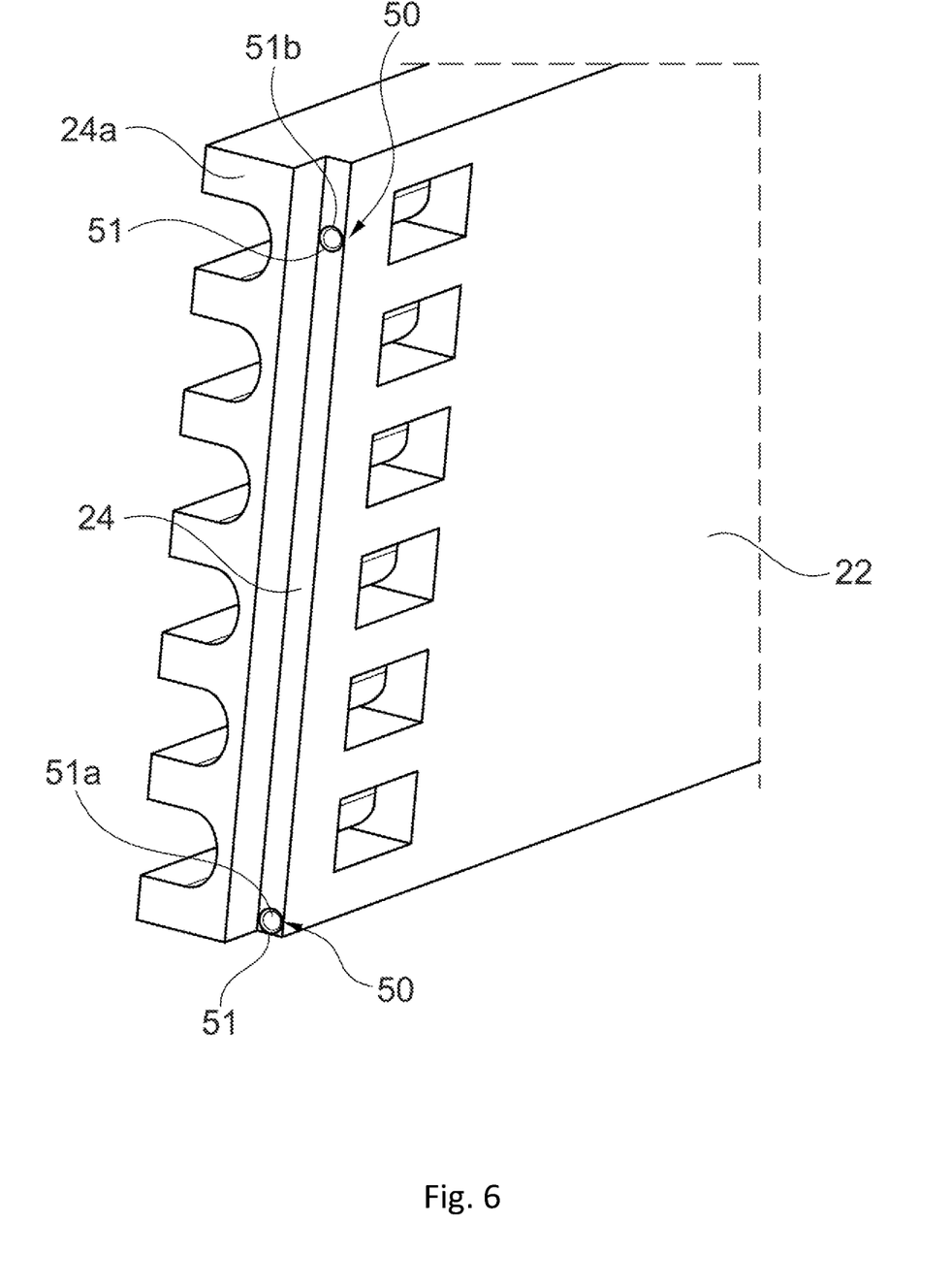
FIG. 6 is a second perspective view of a splice holder according to one embodiment of the present disclosure.

The splice holders 20 comprise holding members 21 configured to hold optical fiber splices 2.

Each splice holder 20 comprises a support base 22 on which the optical fiber splices 2 can be retained.

Each support base 22 has a first portion 23 and a second portion 24 spaced apart along a first direction A-A transversal to the sliding direction X-X for a width Wb. Specifically, the first portion 23 and the second portion 24 of each splice holder 20 are configured to engage the respective retaining arrangements 30. In detail, the first portion 23 and the second portion 24 of each splice holder 20 are configured to engage respective sliding guides 40.

According to one embodiment, each support base 22 comprises a first projecting wing 23a at the first portion 23 and second projecting wing 24a at the second portion 24. The first projecting wing 23a and the second projecting wing 24a are configured to be inserted between two adjacent first guiding members 41 and two adjacent second guiding members 42. Specifically, the first projecting wing 23a and the second projecting wing 24a are configured to respectively engage the first sliding seat 44 and the second sliding seat 45 and to allow the slide of the splice holder 20 along the sliding direction X-X.

Thanks to the engagement between the first projecting wings 23a and the second projecting wings 24a and the first sliding seats 44 and the second sliding seats 45, the sliding guides 40 allow the passage of the optical fibers 3 to the splice holders 20 avoiding crossover of the optical fibers. Furthermore, such engagement simplifies the sliding of the splice holder 20 and the installation and maintenance operation.

Each support base 22 has a third portion 25 and a fourth portion 26 mutually spaced apart along a second direction B-B perpendicular to the first direction A-A for a height Hb. Specifically, the second direction B-B is parallel to the sliding direction X-X. By this arrangement, the third portion 25 faces the base 10 upon insertion of the respective splice holder 20 in the retaining arrangement 30, while the fourth portion 26 is spaced apart from the base 10 upon insertion of the respective splice holder 20 in the retaining arrangement 30.

It is to be noted, that each support base 22 can comprise a grip portion 27, for example, a tab protruding from the fourth portion 26, configured to be grasped by a user to ease the sliding of the splice holder 20.

According to one embodiment, the holding members 21 project from each support base 22 and are configured to hold and separate the optical fiber splices 2 one from the other. The holding members 21 can comprise mutually parallel holding walls 21a projecting from the support base 22 along the transversal direction Z-Z. Specifically, the holding walls 21a extend along the first direction A-A. The holding walls 21a are mutually spaced apart along the sliding direction X-X to define therebetween holding seats 21b. The holding seats 21b receive and hold the optical fiber splices 2 therebetween. In detail, the holding walls 21a are flexible in order to facilitate the insertion of the optical fiber splices 2 into the holding seats 21b.

Thanks to the holding members 21, each optical fiber splice 2 is held in a defined position chosen during the installation and maintenance operations. Furthermore, a defined position for the optical fiber splices 2 allows easy identification of an optical fiber splice 2 on the splice tray 1.

In detail, each holding wall 21a can comprise one or more retaining tabs to improve the grip on the optical fiber splices 2 thereby avoiding the optical fiber splices 2 disengaging from the holding members 21. Each tab can project from the respective holding wall 21a towards the holding seat 21b.

The holding members 21 can hold optical fiber splices 2 having different sizes and/or shape. Therefore, the holding walls 21a can be mutually spaced apart in order to receive optical fiber splices 2 having different diameters in a range between 1 mm to 2.5 mm. Furthermore, the holding walls 21a can be extended along the transversal direction Z-Z in order to hold optical fiber splices 2 having different lengths in range between 30 mm to 45 mm.

According to one embodiment, the splice tray 1 can comprise splice holders 20 adapted to retain different types of optical fiber splice 2.

According to an alternative embodiment, the holding members 21 can comprise holding elements configured to act on the ends of the optical fiber splices 2 in order to hold them on the support base 22 thereby reducing the space between adjacent optical fiber splices 2 and therefore increasing the number of optical fiber splices 2 that can be retained by the splice holders 20.

Figure 1:
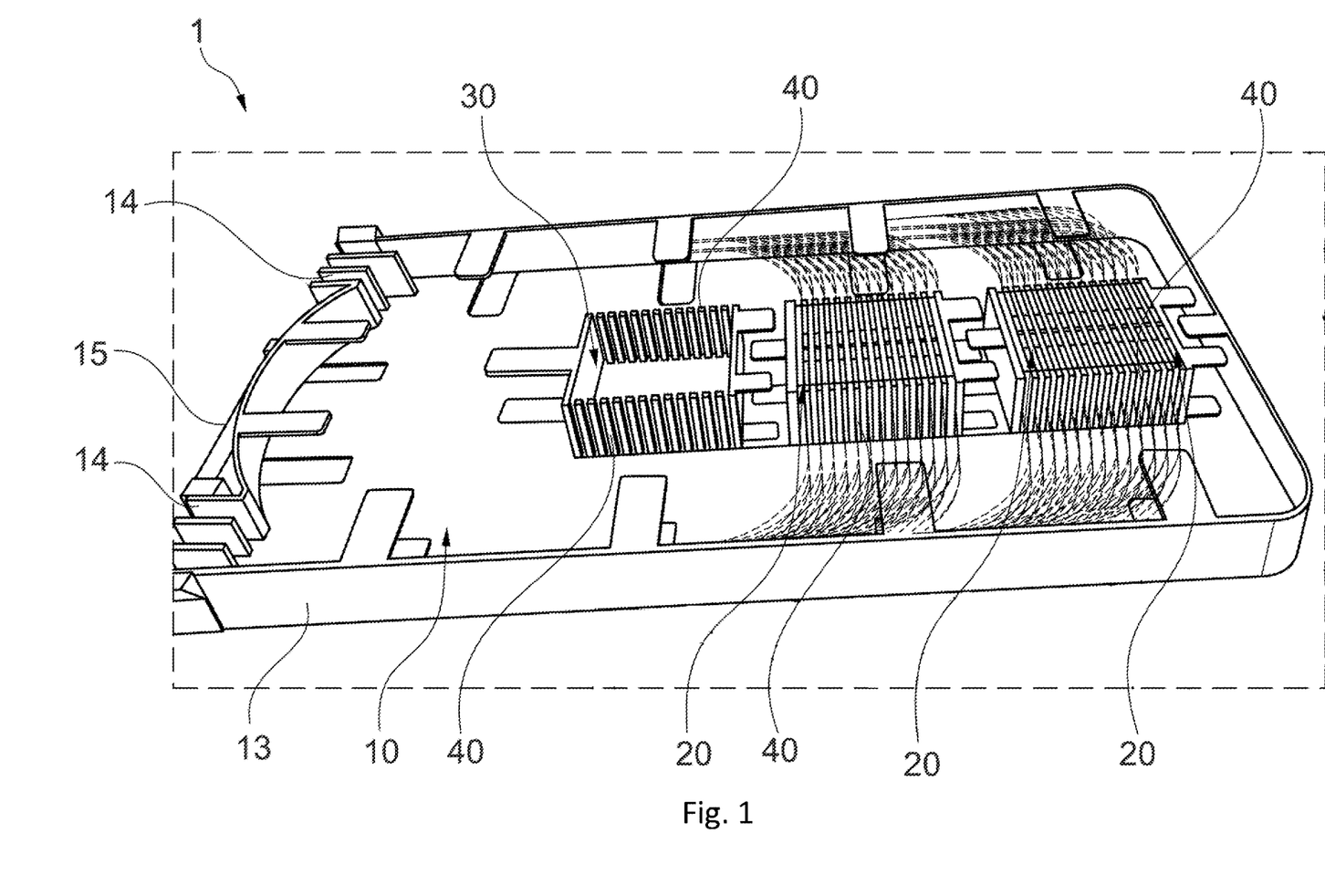
FIG. 1 is a perspective view of a splice tray according to one embodiment of the present disclosure, with splice holders in retracted position.
Figure 2:
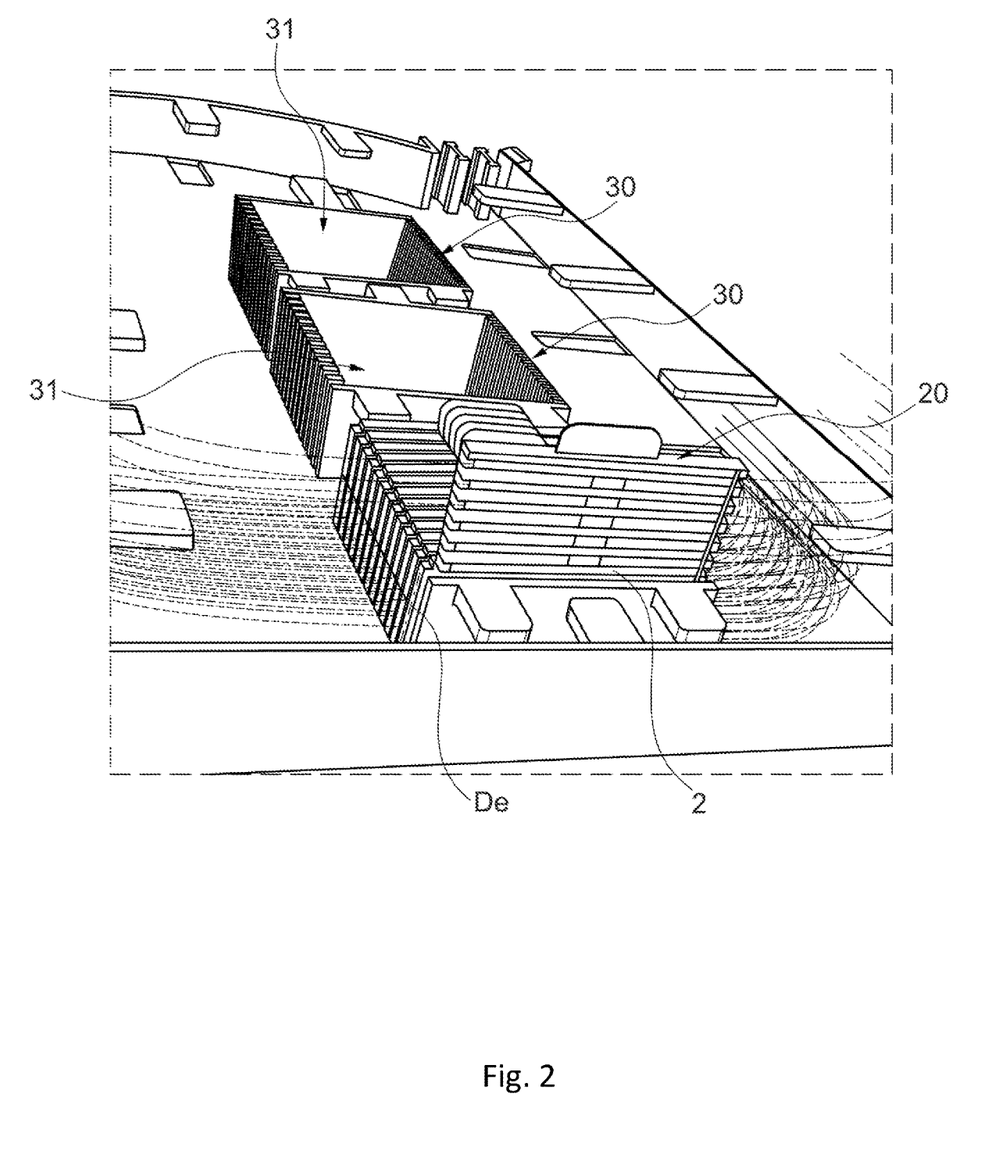
FIG. 2 is a perspective view of a splice tray according to one embodiment of the present disclosure, with at least a splice holder in extracted position.
Figure 3:
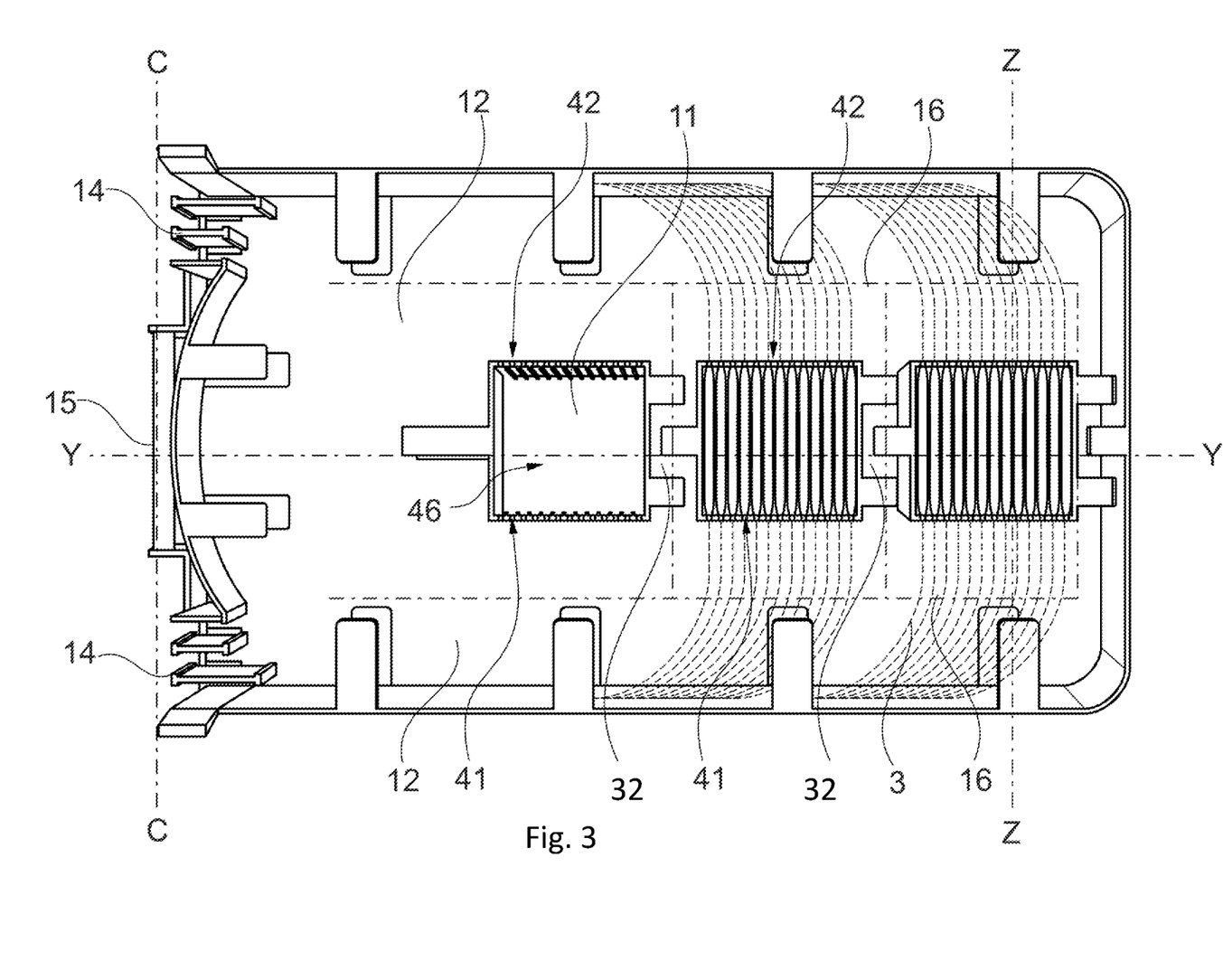
FIG. 3 is a top view of the splice tray of FIG. 1.
Figure 4:
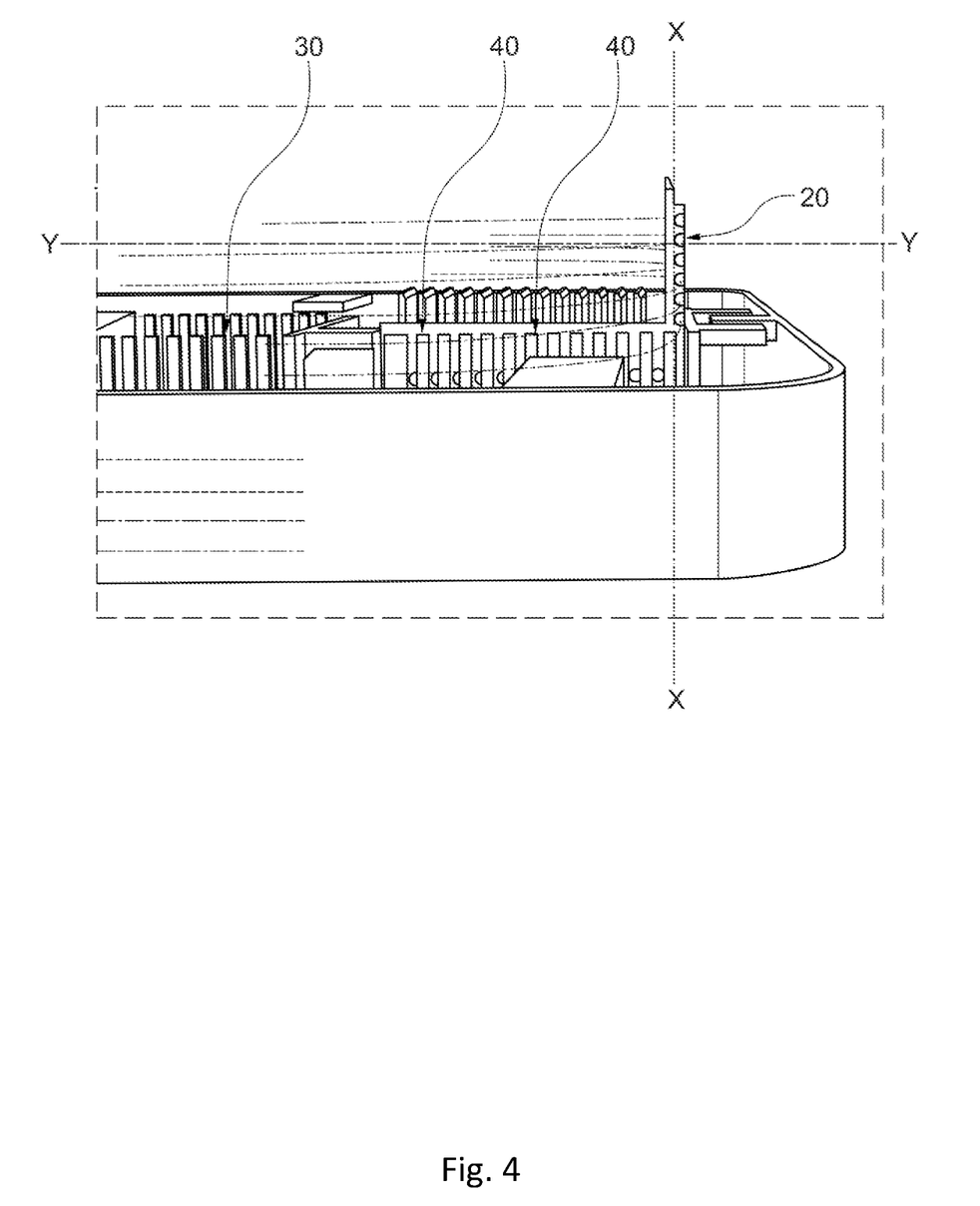
FIG. 4 is a side view of the splice tray of FIG. 2.

According to one embodiment, each splice holder 20 is slidable relative to the sliding guides 40 along the sliding direction X-X between a retracted position, in which the splice holder 20 is proximate to the base 10 and an extracted position in which the splice holder 20 is spaced apart from the base 10 along the sliding direction X-X.

Specifically, in the retracted position the third portion 25 is proximal to the base 10, while in the extracted position the third portion 25 is spaced apart from the base 10 for an extraction distance De. In other words, the fourth portion 26 in the retracted position is spaced apart from the base 10 substantially for a distance equal to the height Hb of the support base 22, while in the extracted position the fourth portion 26 is spaced apart from the base 10 for a distance equal to the sum of the height Hb of the support base 22 and the extraction distance De.

Furthermore, the sliding of the splice holders 20 is limited to the height of the sliding guides 40. Therefore, splice holders 20 can slide along the sliding guides for an extraction distance De in a range between zero and the height of the sliding guides 40.

For the purpose of the present disclosure, the extraction position is to be intended when the extraction distance differs from zero.

It is to be noted that the splice holders 20 allow the access to the holding members 21 when sliding from the retracted position to the extracted position and prevent the access to the holding members 21 when sliding from the extracted position to the retracted position.

According to one embodiment, the retaining arrangements 30 are adjacently arranged along the stacking direction Y-Y in such a way that the support bases 22 of the splice holders 20 are retained in a mutually faced relationship. In a further embodiment, the support bases 22 of the splice holders 20 are retained in a mutually faced and parallel relationship.

Accordingly, splice holders 20 are adjacently stacked along the stacked direction Y-Y transversal to each support base 22 in order to allow a direct access to each splice holder 20 from the fourth portion 26 in the retracted position or in the extracted position. Furthermore, such arrangement allows an independently sliding of each splice holder 20 with respect to the base 10 and with respect to each other.

With this arrangement, splice holders 20 can slide mutually parallel along the sliding direction X-X.

According to one embodiment, the splice tray 1 comprises locking arrangements 50 configured to selectively lock sliding of the splice holders 20 in the retracted position and in the extracted position. The locking arrangements 50 lock the splice holders 20 in the retracted position in order to avoid undesirable sliding of the splice holders 20 with respect to the base 10. Moreover, the locking arrangements 50 lock the splice holders 20 in the extracted position, in order to facilitate operations on the optical fiber splices.

The locking arrangements 50 comprise first locking elements 51 formed on the sliding guides 40 and second locking elements 52 formed on the splice holders 20. The first locking elements 51 and the second locking elements 52 are configured to cooperate in the retracted position and in the extracted position. The first locking elements 51 can be arranged at the first portion 23 and at the second portion 24, while the second locking elements 52 can be arranged on the first guiding members 41 and on the second guiding members 42.

The first locking elements 51 and the second locking elements 52 may be configured to cooperate to selectively retain the splice holders 20 in the retracted position and limit the slide of the splice holders 20 along the sliding direction X-X to lock the splice holders 20 in the extracted position.

The first locking elements 51 and the second locking elements 52 may be configured to cooperate to lock the splice holders 20 in the retracted position or in the extracted position.

According to one embodiment, as shown in FIGS. 6 and 7, the first locking elements 51 comprise lower seats 51a and upper seats 51b formed on the first portion 23 and on the second portion 24 of each splice holder 20.

In detail, the lower seats 51a are formed proximal to the third portion 25 and the upper seats 51b are formed proximal to the fourth portion 26.

The second locking elements 52 comprise first protrusions formed on the first guiding members 41 and second protrusions formed on the second guiding members 42.

It is to be noted that, in view of the symmetry of the splice tray 1, only the first protrusions are shown in the figures.

Each first protrusion protrudes from the first guiding member 41 towards the corresponding second guiding member 42 along the traversal direction Z-Z.

Each second protrusion protrudes from the second guiding member 42 towards the corresponding first guiding member 41 along the traversal direction Z-Z.

It is to be noted that the first protrusions and second protrusions are formed at the second free end portions 41b, 42b of the first guiding members 41 and second guiding members 42, substantially at a distance from the base equal to the height of the sliding guides 40.

Hereinafter, for sake of conciseness, reference is made to the features of the first protrusions.

The first protrusions are configured to engage the lower seats 51a and upper seats 51b to retain the splice holders 20 respectively in extracted position and in the retracted position.

The first protrusions may engage the upper seats 51b of a splice holder 20 in the retracted position to prevent sliding of the splice holder 20 along the sliding direction X-X.

With the splice holder 20 in the retracted position, upon application of an external force on the splice holder 20 directed along the sliding direction X-X away from the base 10, the first protrusions disengage from the upper seats 51b allowing the splice holder 20 to slide. Then, when the first protrusions engage the lower seats 51a of the splice holder 20, the first protrusions stop and limit the sliding of the splice holder 20 in the retracted position.

According to one embodiment, thanks to the locking arrangements 50 and the elastic properties of the first guiding members 41 and the second guiding members 42, mutual engagement and disengagement of the first locking elements 51 and the second locking elements 52 is guaranteed.

According to an alternative embodiment, the locking arrangements 50 can comprise a plurality of protrusions spaced apart along the first guiding members 41 and the second guiding members 42 and/or relative seats on the splice holders in order to lock the splice holder in extracted positions at different distances from the base.

According to a further alternative embodiment, the first locking elements 51 may comprise one or more protrusions and the second locking elements 52 may comprise one or more seats.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A splice tray for optical fiber splices, comprising:
a base having a splice area for retaining optical fiber splices and a routing area for passage of optical fibers from and towards the splice area;
splice holders arranged on the splice area, each splice holder having holding members configured to hold optical fiber splices; and
retaining arrangements arranged on the base and configured to retain the splice holders,
wherein:
  each retaining arrangement includes sliding guides projecting from the base and configured to receive and retain one or more splice holders and arranged mutually adjacent along a stacking direction transversal to the sliding direction to retain the splice holders mutually adjacent along the stacking direction; and
  each splice holder is slidable relative to the sliding guides along a sliding direction transversal to the base between a retracted position and an extracted position, in the retracted position, the splice holder being proximate to the base, in the extracted position, the splice holder being spaced apart from the base along the sliding direction, each splice holder comprising a support base configured to retain the optical fiber splices and comprising:
    a first portion and a second portion spaced apart along a first direction transversal to the sliding direction for a width, the first portion and the second portion being configured to engage respective sliding guides; and
    a first projecting wing at the first portion and a second projecting wing at the second portion, the first projecting wing and the second projecting wing being configured to be inserted between two adjacent retaining arrangements.

2. The splice tray according to claim 1, wherein the base comprises a connecting member defining a rotation axis to pivotally connect the base to an optical termination box.

3. The splice tray according to claim 1, wherein the retaining arrangements are adjacently arranged along the stacking direction in such a way that the support bases of the splice holders are retained in a mutually faced relationship.

4. The splice tray according to claim 3, wherein the support bases of the splice holders are retained in a mutually faced and parallel relationship.

5. The splice tray according to claim 1, wherein the splice tray comprises locking arrangements configured to selectively lock sliding of the splice holders in the retracted position and in extracted position.

6. The splice tray according to claim 5, wherein the locking arrangements comprise first locking elements formed on the sliding guides and second locking elements formed on the splice holders, the first locking elements and the second locking elements being configured to cooperate at least in the retracted position and in the extracted position.

7. The splice tray according to claim 6, wherein the first locking elements and the second locking elements are configured to cooperate to selectively retain the splice holders in the retracted position and limit the slide of the splice holders along the sliding direction to lock the splice holders in the extracted position.

8. The splice tray according to claim 1, wherein the sliding guides comprise first guiding members and second guiding members projecting from the base along the sliding direction.

9. The splice tray according to claim 8, wherein the first guiding members are spaced apart from the second guiding members along a transversal direction perpendicular to the sliding direction to define a receiving area therebetween for receiving the one or more splice holders.

10. The splice tray according to claim 9, wherein
   the first guiding members are mutually spaced apart along a stacking direction transversal to the sliding direction and to the transversal direction, and
   the second guiding members are mutually spaced apart along the stacking direction.

11. The splice tray according to claim 9, wherein the first guiding members and the second guiding members are configured to elastically deform along the transversal direction and generate an elastic force along the transversal direction and directed towards the splice holder upon insertion of the splice holders between the first guiding members and the second guiding members.

12. The splice tray according to claim 1, wherein the holding members comprise parallel holding walls projecting from the support base, each holding wall extending along the first direction and being configured to hold and separate the optical fiber splices.

13. The splice tray according to claim 12, wherein the holding walls are mutually spaced apart along the sliding direction to define holding seats there between configured to receive the optical fiber splices.

14. An optical termination box comprising a splice tray for optical fiber splices, the splice tray including:
   a base having a splice area for retaining optical fiber splices and a routing area for passage of optical fibers from and towards the splice area;
   splice holders arranged on the splice area, each splice holder having holding members configured to hold optical fiber splices; and
   retaining arrangements arranged on the base and configured to retain the splice holders,
   wherein:
      each retaining arrangement includes sliding guides projecting from the base and configured to receive and retain one or more splice holders and arranged mutually adjacent along a stacking direction transversal to the sliding direction to retain the splice holders mutually adjacent along the stacking direction; and
      each splice holder is slidable relative to the sliding guides along a sliding direction transversal to the base between a retracted position and an extracted position, in the retracted position the splice holder being proximate to the base, in the extracted position the splice holder being spaced apart from the base along the sliding direction, each splice holder comprising a support base configured to retain the optical fiber splices and comprising:
         a first portion and a second portion spaced apart along a first direction transversal to the sliding direction for a width, the first portion and the second portion being configured to engage respective sliding guides; and
         a first projecting wing at the first portion and a second projecting wing at the second portion, the first projecting wing and the second projecting wing being configured to be inserted between two adjacent retaining arrangements.

15. The optical termination box according to claim 14, wherein the optical termination box comprises a frame with a bottom wall and one or more side walls projecting from the bottom wall, the bottom wall and the side walls defining a tray area, and the splice tray is arranged on the tray area.

16. The optical termination box according to claim 15, the base of the splice tray comprises a connecting member defining a rotation axis, the connecting member pivotally connecting the base of the splice tray to the frame of the optical termination box.

* * * * *